US012756879B2

(12) United States Patent
Clift

(10) Patent No.: US 12,756,879 B2
(45) Date of Patent: Oct. 6, 2026

(54) TUNE MEDIA PLAYER FOR BROADCAST AND BROADBAND SERVICES

(71) Applicant: SONY GROUP CORPORATION, Tokyo (JP)

(72) Inventor: Graham A Clift, Poway, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/960,427

(22) Filed: Nov. 26, 2024

(65) Prior Publication Data

US 2025/0184550 A1 Jun. 5, 2025

Related U.S. Application Data

(60) Provisional application No. 63/604,706, filed on Nov. 30, 2023.

(51) Int. Cl.

| | |
|---|---|
| ***H04N 21/238*** | (2011.01) |
| ***H04N 21/235*** | (2011.01) |
| ***H04W 28/22*** | (2009.01) |
| ***H04W 72/30*** | (2023.01) |
| ***H04W 72/54*** | (2023.01) |

(52) U.S. Cl.

CPC ....... *H04N 21/238* (2013.01); *H04N 21/2353* (2013.01); *H04W 28/22* (2013.01); *H04W 72/30* (2023.01); *H04W 72/54* (2023.01)

(58) Field of Classification Search

CPC . H04N 21/238; H04N 21/2353; H04W 72/30; H04W 72/54; H04W 28/22

See application file for complete search history.

(56) References Cited

U.S. PATENT DOCUMENTS

| | | | | |
|---|---|---|---|---|
| 2017/0339459 | A1 | 11/2017 | Kim et al. | |
| 2017/0374421 | A1 | 12/2017 | Yim | |
| 2018/0139487 | A1 | 5/2018 | Hale | |
| 2020/0305031 | A1 * | 9/2020 | Lee | H04L 43/0829 |
| 2023/0164383 | A1 * | 5/2023 | Candelore | H04N 21/41407 725/62 |

FOREIGN PATENT DOCUMENTS

| | | | |
|---|---|---|---|
| CN | 103428543 | A | 12/2013 |

OTHER PUBLICATIONS

Ekmekcioglu, et al., "Adaptive multi-view video delivery using hybrid networking", IEEE, Jan. 1, 2017, 13 pages.

* cited by examiner

*Primary Examiner* — Yassin Alata
(74) *Attorney, Agent, or Firm* — CHIP LAW GROUP

(57) ABSTRACT

An electronic device and a method for tuning of media player to broadcast and broadband services. The electronic device receives media content for playback. The electronic device determines that the media content includes OTA media content and OTT media content. The electronic device compares a first bit rate of the OTA media content with a second bit rate of the OTT media content. The electronic device sets a reported bit rate of the media player to a first predetermined value, based on the comparison. The OTT media content is played-back, based on the first predetermined value. It is monitored that the electronic device is tuned for OTA playback and the reported bit rate of the media player is set to a second predetermined value based on the monitoring. The OTA media content is played-back, based on the second predetermined value.

20 Claims, 5 Drawing Sheets

TUNE MEDIA PLAYER FOR BROADCAST AND BROADBAND SERVICES

CROSS-REFERENCE TO RELATED APPLICATIONS/INCORPORATION BY REFERENCE

This application also makes reference to U.S. Provisional Application Ser. No. 63/604,706, which was filed on Nov. 30, 2023. The above stated patent application is hereby incorporated herein by reference in its entirety.

FIELD

Various embodiments of the disclosure relate to content delivery systems. More specifically, various embodiments of the disclosure relate to an electronic device and a method to tune a media player for broadcast and broadband services.

BACKGROUND

Advancements in the field of telecommunication and video compression technologies have led to the development of video delivery systems that are designed to provide media content to users through various transmission methods. In the realm of video delivery, a multitude of standards and protocols have been established to enable the efficient transfer and reception of media content. Such standards and protocols may support a range of features, including enhanced video and audio quality, interactive services, and access to multiple content streams.

The delivery of live video services may often involve the use of different transmission sources and methods. The transition between the media sources during playback can be intricate, sometimes may require manual intervention or sophisticated algorithms. The overall experience of video playback can be influenced by several factors, including the consistency and reliability of the transmission sources, the strength and stability of the connection through which the content is delivered, and the display resolution of the media content. There is a need to improve a user experience of playback of the media content, based on a simplification of the process of source transition and an enhancement the playback quality of media content.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method to tune a media player for broadcast and broadband services is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
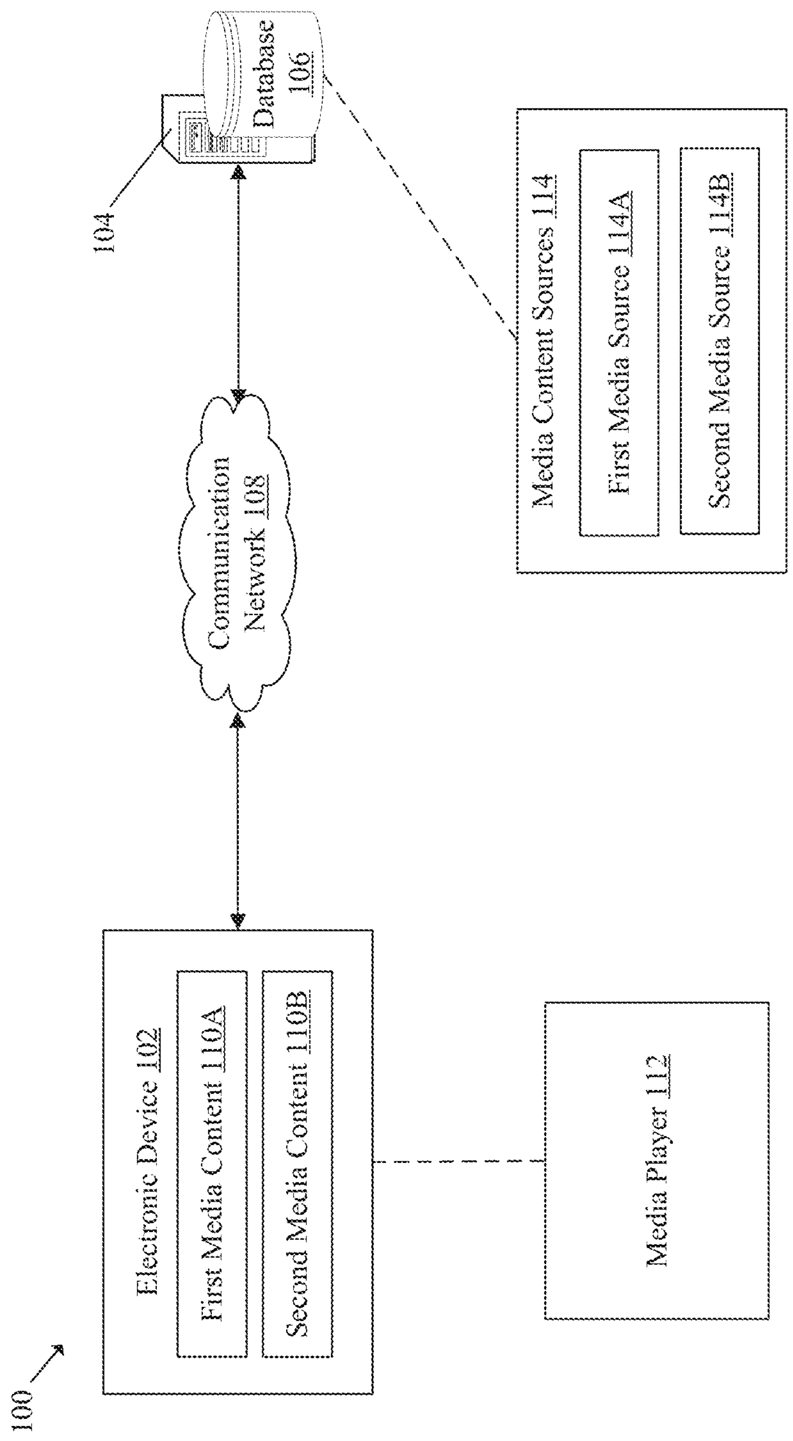
FIG. 1 is a block diagram that illustrates an exemplary network environment to tune a media player for broadcast and broadband services, in accordance with an embodiment of the disclosure.

The present disclosure relates to an adaptive live video delivery system that may utilize both broadband and broadcast sources. The following described implementation may be found in an electronic device that may be configured to receive media content for playback on a media player. The received media content may be selected and tuned on the electronic device. The electronic device may determine that the received media content includes first media content over an Over-The-Air (OTA) media stream and second media content over an Over-The-Top (OTT) media stream. The electronic device may then compare a first bit rate of the OTA media stream with a second bit rate of the OTT media stream, based on the determination that the received media content includes the first media content and the second media content.

The electronic device may set a reported bit rate of the media player to a first predetermined value higher than the second bit rate of the OTT media stream, based on the first bit rate being lower than the second bit rate. The media player may then be controlled to playback the second media content, based on the reported bit rate set to the first predetermined value. The electronic device may be monitored for being tuned for OTA playback, based on the first bit rate being higher than the second bit rate. The reported bit rate of the media player may be set to a second predetermined value higher than the first bit rate of the OTA media stream, based on the monitoring. The media player may then be controlled to playback the first media content, based on the reported bit rate set to the second predetermined value.

Traditional systems may often rely on a single media source, either broadband or broadcast, which can lead to interruptions in service if the source becomes unavailable or congested. In contrast, the present system may intelligently switch between broadband and broadcast sources based on various conditions such as service availability, connection quality, and video resolution, which may ensure a seamless viewing experience.

The present system's adaptive capabilities may allow optimization of content playback based on the current conditions. For instance, if the quality of the broadband connection is poor, the system may switch to a broadcast source to maintain continuous streaming. Conversely, if the broadcast signal is weak, the system may dynamically switch to a broadband source to enhance picture quality. Thus, unlike traditional systems, the present system may not require manual intervention to switch sources. Furthermore, the present system may be designed to support both broadcast receivers that support broadband representations of live content, and also, apps that are designed to primarily support broadband playback of live content but also have access to a broadcast tuner. The dual support may allow the system to cater to a wider range of use cases and scenarios, which may make the system more versatile than traditional systems that support either broadcast or broadband delivery.

The present system may include features for detection of service availability and assessment of the quality of the service, which can help to ensure a robust and reliable video stream. Such features, combined with the system's adaptive capabilities, may work together to provide a superior viewing experience for live video content, regardless of the source of delivery. The present system may thereby deliver a marked improvement in content playback experience over traditional systems, which may often struggle to maintain a consistent quality of service when faced with changing network conditions.

FIG. 1 is a block diagram that illustrates an exemplary network environment for to tune a media player for broadcast and broadband services, in accordance with an embodiment of the disclosure. With reference to FIG. 1, there is shown a network environment 100. The network environment 100 may include an electronic device 102, a server 104, a database 106, and a communication network 108. The electronic device 102 may include a media player 112 configured to playback of first media content 110A and second media content 110B. FIG. 1 further shows media content sources 114 may be associated with the electronic device 102 and the media player 112. In FIG. 1, there is further shown a first media source 114A and a second media source 114B that may be stored in the database 106. Further, there is shown a user 116 who may be associated with and/or operate the electronic device 102.

The electronic device 102 may include suitable logic, circuitry, interfaces, and/or code that may be configured to receive media content for playback on the media player 112. The received media content may be selected and tuned on the electronic device 102. The electronic device 102 may determine that the received media content includes the first media content 110A over an Over-The-Air (OTA) media stream and the second media content 110B over an Over-The-Top (OTT) media stream. The electronic device 102 may compare the first bit rate of the OTA media stream with the second bit rate of the OTT media stream, based on the determination that the received media content includes the first media content 110A and the second media content 110B. The electronic device 102 may set the reported bit rate of the media player 112 to a first predetermined value higher than the second bit rate of the OTT media stream, based on the first bit rate being lower than the second bit rate. The electronic device 102 may control the media player 112 to playback the second media content 110B, based on the reported bit rate of the media player 112 set to the first predetermined value. The electronic device 102 may be monitored for being tuned for OTA playback, based on the first bit rate being higher than the second bit rate. The electronic device 102 may set the reported bit rate of the media player 112 to a second predetermined value higher than the first bit rate of the OTA media stream, based on the monitoring of the electronic device 102. The electronic device 102 may control the media player 112 to switch the playback from the second media content 110B to the first media content 110A, based on the reported bit rate set to the second predetermined value. Examples of the electronic device 102 may include, but are not limited to, a computing device, a smartphone, a cellular phone, a mobile phone, a gaming device, a mainframe machine, a server, a computer workstation, a wearable device, and/or a consumer electronic (CE) device.

The server 104 may include suitable logic, circuitry, and interfaces, and/or code that may be configured to receive the media content for playback on the media player 112. The server 104 may determine that the received media content includes the first media content 110A over the OTA media stream and the second media content 110B over the OTT media stream. The server 104 may compare the first bit rate of the OTA media stream with the second bit rate of the OTT media stream, based on the determination that the received media content includes the first media content 110A and the second media content 110B. The server 104 may set the reported bit rate of the media player 112 to the first predetermined value higher than the second bit rate of the OTT media stream, based on the first bit rate being lower than the second bit rate. The server 104 may control the media player 112 to playback of the second media content 110B, based on the reported bit rate of the media player 112 set to the first predetermined value. The server 104 may monitor that the electronic device 102 is tuned for OTA playback, based on the first bit rate being higher than the second bit rate. The server 104 may set the reported bit rate of the media player 112 to the second predetermined value higher than the first bit rate of the OTA media stream, based on the monitoring that the electronic device 102 is tuned for OTA playback. The server 104 may control the media player 112 to switch the playback from the second media content 110B to the first media content 110A, based on the reported bit rate of the media player 112 set to the second predetermined value.

The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the media content sources 114. The database 106 may be configured to store the first media source 114A and the second media source 114B. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device storing the database 106 may be configured to receive a query for media content to playback the media content on the media player 112, from the electronic device 102 or the server 104. In response, the device of the database 106 may be configured to retrieve and provide the queried media content to the electronic device 102 or the server 104 for the playback, based on the received query.

In some embodiments, the database 106 may be hosted on a plurality of servers stored at the same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 and the server 104 may communicate with one another. The communication network 108 may be one of a wired connection or a wireless connection. Examples of the communication network 108 may include, but are not limited to, the Internet, a cloud network, Cellular or Wireless Mobile Network (such as Long-Term Evolution and $5^{th}$ Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The first media content 110A and the second media content 110B may be configured to be played through the media player 112 of the electronic device 102. The first media content 110A may correspond to the OTA media content and may be associated with the first media source 114A. The second media content 110B may correspond to the OTT media content and may be associated with the second media source 114B.

The media player 112 may include suitable logic, circuitry, interfaces, and/or code configured to play the first media content 110A and the second media content 110B. The media player 112 may be configured to receive media content (e.g., the first media content 110A and the second media content 110B) for playback through the electronic device 102. The media player 112 may include a stream buffer that may store chunks or segments of the media content during the reception and playback of the media content for bit rate matching between the reception and playback. Further, the media player 112 may determine a bit rate of each media stream of the OTA media stream (e.g., from the first media source 114A) and the OTT media stream (e.g., from the second media source 114B).

The media content sources 114 may include the first media source 114A and the second media source 114B to provide the first media content 110A (e.g., associated with OTA content) and the second media content 110B (e.g., associated with OTT content), respectively, for playback. In an embodiment, the media content sources 114 may include one or more types of content distribution equipment including a television distribution facility, a cable system headend, a satellite distribution facility, programming sources (e.g., television broadcasters), intermediate distribution facilities and/or servers, Internet providers, on-demand content servers, and other content providers. The media content sources 114 may be an originator of content (e.g., in case of a television broadcaster or a Webcast provider) or may be distributer of content (e.g., an intermediatory entity that provides an on-demand content, or an Internet service provider).

In operation, the electronic device 102 may receive media content for playback on the media player 112. The received media content may be selected and tuned on the electronic device 102. The media content may refer to the first media content 110A over the OTA media stream and the second media content 110B over the OTT media stream. In an example, the electronic device 102 may retrieve the first media content 110A and the second media content 110B from the database 106. In another example, the electronic device 102 may receive the first media content 110A and the second media content 110B from the first media source 114A and the second media source 114B, respectively. Details related to reception of the media content are further described, for example, in FIG. 3 (at 302).

The electronic device 102 may determine that the received media content includes the first media content 110A over the OTA media stream and the second media content 110B over the OTT media stream. The electronic device 102 may determine that the media content includes information that indicates presence of the first media content 110A and the second media content 110B. Details related to the determination that the received media includes the first media content and the second media content are further described, for example, in FIG. 3 (at 304).

The electronic device 102 may be configured to compare a first bit rate of the OTA media stream (associated with the first media content 110A) with a second bit rate of the OTT media stream (associated with the second media content 1101B), based on the determination that the received media content includes the first media content 110A and the second media content 110B. For example, the electronic device 102 may determine the first bit rate associated with the streaming of the OTA media stream and also determine the second bit rate associated with the streaming of the OTT media stream. Thereafter, the electronic device 102 may compare the first bit rate and the second bit rate to determine that the first bit rate is lesser than the second bit rate. Details related to the comparison of the first bit rate with the second bit rate are described further, for example, in FIG. 3 (at 306).

The electronic device 102 may be configured to set a reported bit rate of the media player 112 to a first predetermined value higher than the second bit rate of the OTT media stream, based on the first bit rate being lower than the second bit rate. The electronic device 102 may first determine that the first bit rate is lower than the second bit rate. In case the first bit rate is lower than the second bit rate (i.e., the second bit rate is greater than the first bit rate), the electronic device 102 may set the reported bit rate of the media player 112 to a certain value (i.e., the first predetermined value), which may be higher than the second bit rate. Thus, the reported bit rate may be set to a value greater than the higher bit rate (i.e., the second bit rate) among the first bit rate and the second bit rate. Details related to the setting of the reported bit rate are discussed further, for example, in FIG. 3 (at 308).

The electronic device 102 may be configured to control the media player 112 to playback the second media content 110B, based on the reported bit rate set to the first predetermined value. For example, in case the first bit rate is lower than the second bit rate, the reported bit rate of the media player 112 may be set as a certain value (i.e., the first predetermined value), which may be higher than the second bit rate. Based on the reported bit rate of the media player 112 set to the first predetermined value, the electronic device 102 may control the media player 112 to playback the second media content 110B (from, e.g., the OTT media stream). Details related to the control of the media player are further discussed, for example, in FIG. 3 (at 310).

The electronic device 102 may be configured to monitor that the electronic device 102 is tuned for OTA playback, based on the first bit rate being higher than the second bit rate. For example, based on the comparison of the first bit rate and the second bit rate, the electronic device 102 may determine that the first bit rate is higher than the second bit rate. In case the first bit rate is determined as higher than the second bit rate, based on the comparison, the electronic device 102 may track tuning of the electronic device 102 for the OTA playback. In an example, the tracking of the tuning may be executed by use of an interrupt-based technique or a polling-based technique. Details related to the monitoring that the electronic device is tuned for OTA playback are described further, for example, in FIG. 3 (at 312).

The electronic device 102 may be configured to set the reported bit rate of the media player 112 to a second predetermined value higher than the first bit rate of the first media content 110A over the OTA media stream, based on the monitoring that the electronic device 102 is tuned for OTA playback. The second predetermined value may correspond to a bit rate higher than the determined first bit rate of the OTA media stream. Details related to the setting of the reported bit rate are discussed further, for example, in FIG. 3 (at 314).

The electronic device 102 may be configured to control the media player 112 to playback the first media content 110A, based on the reported bit rate set to the second predetermined value. For example, in case the first bit rate is higher than the second bit rate, the electronic device 102 may monitor that the electronic device 102 is tuned for OTA playback. Based on the monitoring of the electronic device 102, the reported bit rate of the media player 112 may be set as a certain value (i.e., the second predetermined value), which may be higher than the first bit rate. Based on the reported bit rate of the media player 112 set to the second predetermined value, the electronic device 102 may control the media player 112 to playback the first media content 110A (from, e.g., the OTA media stream). Details related to the control of the media player are further discussed, for example, in FIG. 3 (at 316).

Traditional systems may rely on a single media source, either broadband or broadcast, which can lead to interruptions in service if the source becomes unavailable or congested. In contrast, the present system may intelligently switch between broadband and broadcast sources based on various conditions such as service availability, connection quality, and video resolution, which may ensure a seamless viewing experience.

Figure 2:
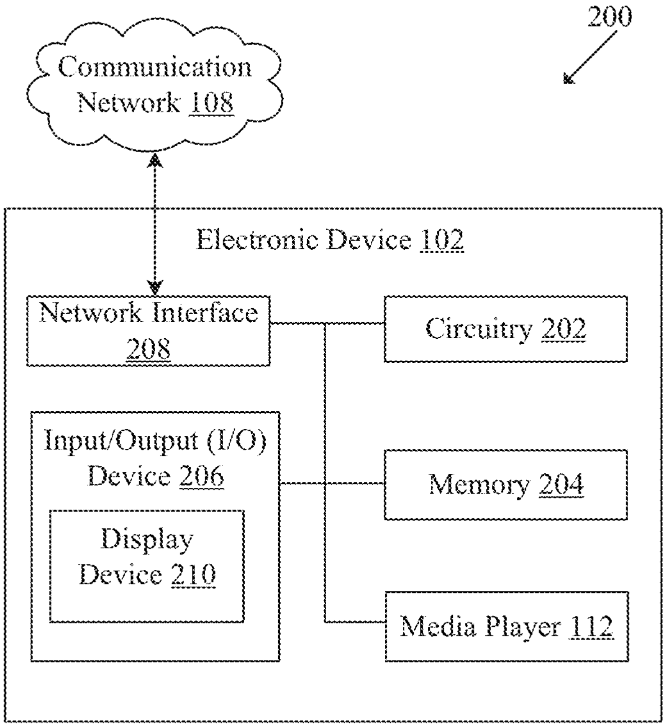
FIG. 2 is a block diagram that illustrates an exemplary electronic device of FIG. 1, in accordance with an embodiment of the disclosure.

The present disclosure enables optimization of content playback based on the network conditions. For instance, if the quality of the broadband connection is poor, the electronic device 102 may switch to a broadcast source to maintain continuous streaming. Conversely, if the broadcast signal is weak, the system may dynamically switch to a broadband source to enhance picture quality. Thus, unlike traditional systems, the electronic device 102 may not require manual intervention to switch sources. Furthermore, the electronic device 102 may be designed to support both broadcast receivers that support broadband representations of live content, and also, apps that are designed to primarily support broadband playback of live content but also have access to a broadcast tuner. The dual support may allow the electronic device 102 to cater to a wider range of use cases and scenarios, which may make the electronic device 102 more versatile than traditional systems that support either broadcast or broadband delivery. The disclosed electronic device 102 may include features for detection of service availability and assessment of the quality of the service, which can help to ensure a robust and reliable video stream. Such features, combined with the adaptive capabilities, may work together to provide a superior viewing experience for live video content, regardless of the source of delivery. The disclosed electronic device 102 may thereby deliver a marked improvement in content playback experience over traditional systems, which may often struggle to maintain a consistent quality of service when faced with changing network conditions FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary a block diagram 200 of the electronic device 102. The electronic device 102 may include the media player 112, a circuitry 202, a memory 204, an input/output (I/O) device 206, and a network interface 208. The memory 204 may store different types of media contents. The memory 204 may store the first media content 110A (e.g., the OTA media content) and the second media content 110B (e.g., the OTT media content). The input/output (I/O) device 206 may include a display device 210.

The circuitry 202 may include suitable logic, circuitry, and/or interfaces that may be configured to execute program instructions associated with different operations to be executed by the electronic device 102. The operations may include a media content selection and tuning operation, media streams determination, media streams bit rate comparison, a media player reported bit rate first setting, a second media content playback initiation, a first tuning monitoring initiation, a media player reported bit rate second setting, and a first media content playback initiation. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be further configured to store the first media content 110A and the second media content 110B. Examples of implementation of the memory 204 may include, but are not limited to, Random Access Memory (RAM), Read Only Memory (ROM), Electrically Erasable Programmable Read- Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input indicative of a selection of media content for playback on the media player 112. The I/O device 206 may also receive a user input associated with a tuning of the electronic device 102 to playback media content from a certain media source. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102 and the server 104, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), block 5$^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render media content played back by the media player 112. The display device 210 may be a touch screen which may enable a user or users to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for implementation of the adaptive switching in the content delivery systems are described further, for example, in FIG. 3.

Figure 3:
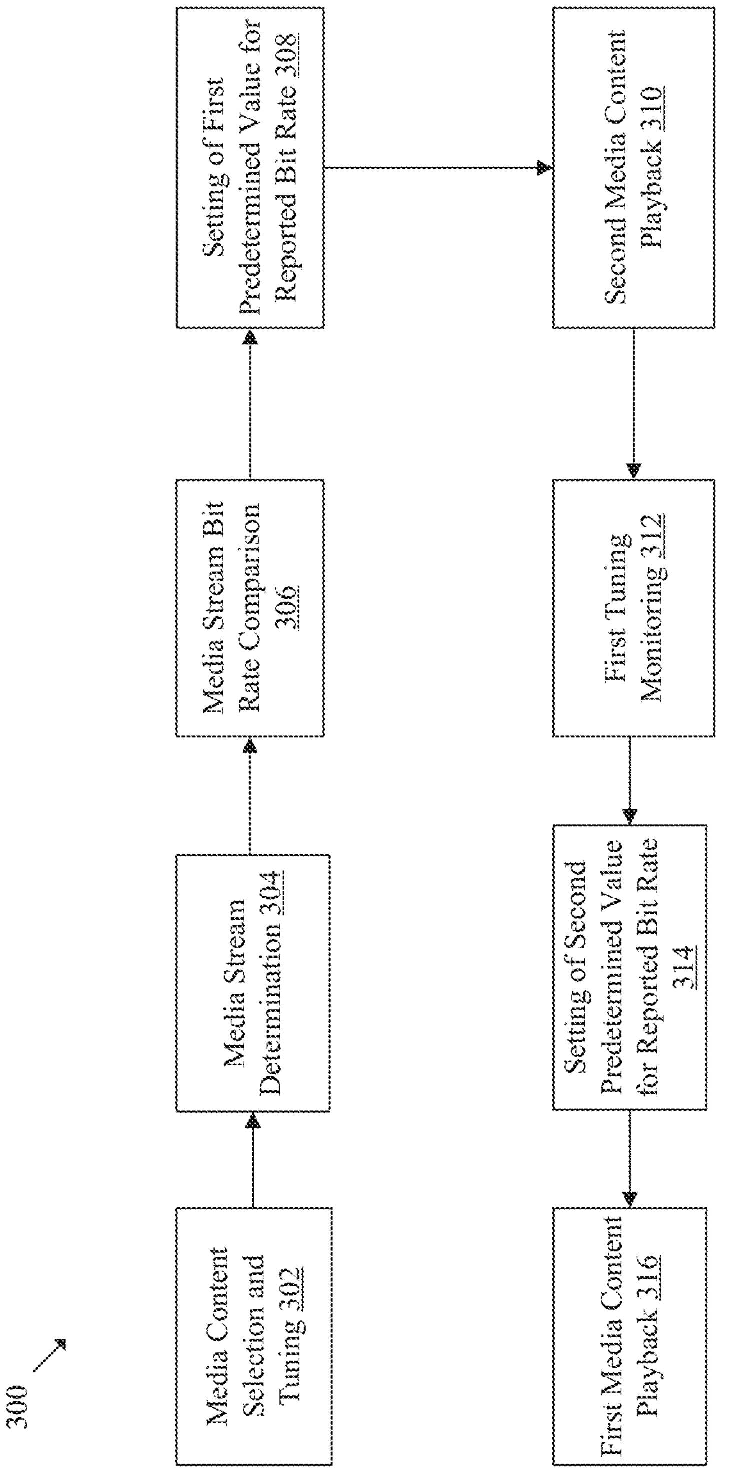
FIG. 3 is a diagram that illustrates an exemplary processing pipeline to tune a media player for broadcast and broadband services, in accordance with an embodiment of the disclosure.

FIG. 3 is a diagram that illustrates an exemplary processing pipeline to tune a media player for broadcast and broadband services, in accordance with an embodiment of the disclosure. FIG. 3 is explained in conjunction with elements from FIG. 1 and FIG. 2. With reference to FIG. 3, there is shown an exemplary processing pipeline 300 that illustrates exemplary operations from 302 to 316 for implementation of the tuning of the media player 112. The exemplary operations 302 to 316 may be executed by any computing system, for example, by the electronic device 102 of FIG. 1 or by the circuitry 202 of FIG. 2.

At 302, an operation for initiating media content selection and tuning may be executed. The circuitry 202 may be configured to receive the media content for playback on the media player 112. The electronic device 102 may retrieve the first media content 110A and the second media content 110B from the database 106. In an embodiment, the electronic device 102 may receive the first media content 110A from an OTA media stream (such as, the first media source 114A) and may receive the second media content 110B from an OTT media stream (such as, the second media source 114B). The circuitry 202 may be further configured to determine that the received media content includes the first media content 110A to be played over the OTA media stream and the second media content 110B to be played over the OTT media stream. For example, the electronic device 102 is configured to receive a video stream content for playback on the media player 112. The received video stream content may be selected and tuned to be played at a resolution of 480p at 30 fps.

The media content sources 114 may provide the first media content 110 and the second media content 110B as media content items. It may be appreciated that the term "media content item" should be understood to mean an electronically consumable user asset, such as television programming, as well as pay-per-view programs, on-demand programs, Internet content (e.g., streaming content, downloadable content, or Webcasts), video clips, audio, playlists, electronic books, social media, applications, games, any other media, or any combination thereof. The media content items may be recorded, played, displayed, or accessed by devices.

At 304, an operation for media streams determination may be executed. The circuitry 202 may be configured to determine that the received media content includes the first media content 110A over the OTA media stream and the second media content 110B over the OTT media stream. For example, the received video stream content includes a first video content to be played over the OTA media stream at the resolution of 360p at 10 fps and a second video content to be played over the OTT media stream at 480p at 20 fps. In an example, media content received from each media source (i.e., the first media source 114A and the second media source 114B) may include information indicative of that the respective media content is currently streaming or broadcasting content. Based on receipt of such information from the respective media sources, the electronic device 102 may determine that the received media content includes the first media content 110A over the OTA media stream and the second media content 110B over the OTT media stream.

At 306, an operation for media streams bit rate comparison may be executed. The circuitry 202 may be configured to compare the first bit rate of the OTA media stream with the second bit rate of the OTT media stream, based on the determination that the received media content includes the first media content 110A and the second media content 110B. The OTA media stream may be the media stream corresponding to the first media content 110A and the OTT media stream is the media stream corresponding to the second media content 110B. For example, a first bit rate of the first video content played over the OTA media stream at the resolution of 360p at 10 fps may be 500 kilo-bits per second, and a second bit rate of the second video content to be played over the OTT media stream at 480p at 20 fps may be 1500 kilo-bits per second. The first bit rate of "500" for the first video content may be compared with the second bit rate of "1500" for the second video content. Based on the comparison, the electronic device 102 may determine that the first bit rate is lower than the second bit rate.

At 308, an operation for a first setting of the reported bit rate of the media player may be executed. The circuitry 202 may be configured to set the reported bit rate of the media player 112 to a first predetermined value higher than the second bit rate of the OTT media stream, based on the first bit rate of the first media content 110A being lower than the second bit rate of the second media content 110B. The first predetermined value may correspond to a bit rate higher than the second bit rate of the OTT media stream. The first predetermined value may correspond to the bit rate higher than the first bit rate of the OTA media stream.

In an example, the first bit rate of the first media content 110A may be "500" kilo-bits per second and the second bit rate of the second media content 110B may be "1500" kilo-bits per second. In the current scenario, based on the comparison of the first bit rate and the second bit rate, the electronic device 102 may determine that first bit may be lower than the second bit rate. The electronic device 102 may set the reported bit rate of the media player 112 to a value (i.e., the first predetermined value) greater than the second bit rate. For example, the reported bit rate may be set as "2000" kilo-bits per second, which may be higher than the second bit rate of "1500" kilo-bits per second for the second video content. The circuitry 202 may be configured to control the media player 112 to playback of the second video content (second media content), based on the reported bit rate of the media player 112 set to the first predetermined value.

At 310, an operation for second media content playback initiation may be executed. The circuitry 202 may be configured to control the media player 112 to playback the second media content 1101B, based on the reported bit rate of the media player 112 set to the first predetermined value. For example, based on the reported bit rate of the media player 112 set the first predetermined value of "2000" kilo-bits per second, the electronic device 102 may control the media player 112 to playback the second media content 110B over the OTT media stream. In an example, the second bit rate of the second media content 110B may be "1500" kilo-bits per second. Thus, the playback of the second media content 110B may be initiated at an enhanced bit rate. For example, the second media content 110B may correspond to a video with a resolution of 480p at a frame rate of 20 fps. Based on the enhanced bit rate, the playback of the second media content 110B may be switched to a higher resolution of 720p and higher frame rate at 40 fps. The enhanced bit rate may enrich a viewing experience of the user.

At 312, an operation for monitoring of first tuning monitoring may be executed. The circuitry 202 may be configured to monitor that the electronic device 102 is tuned for OTA playback, based on the first bit rate being higher than the second bit rate. For example, in case the first bit rate is "2100" kilo-bits per second for the first media content 110A and the second bit rate is "1500" kilo-bits per second for the second media content 110B, the electronic device 102 may select the first media content 110A over the OTA media stream for playback. In order to playback the first media content 110A, the electronic device 102 may monitor that the electronic device 102 is tuned for OTA playback, such that the first bit rate (e.g., "2100" kilo-bits per seconds) may be higher than the second bit rate (e.g., "1500" kilo-bits per second).

At 314, an operation for a second setting of the reported bit rate of the media player may be executed. The circuitry 202 may be configured to set the reported bit rate of the media player 112 to the second predetermined value, based on the monitoring that the electronic device 102 is tuned for OTA playback. In an example, the second predetermined value may be higher than the first bit rate of the OTA media stream.

For example, based on the monitoring of the electronic device 102, the electronic device 102 may detect that the electronic device 102 has been tuned for playback of the OTA media content. In an example, the reported bit rate of the media player 112 may be set to the second predetermined value of "4000" kilo-bits per second, while the first bit rate of the OTA media stream may be a lower value, such as, "2100" kilo-bits per second.

At 316, the first media content playback initiation may be executed. The circuitry 202 may be configured to control the media player 112 to switch the playback from the second media content 110B to the first media content 110A, based on the reported bit rate of the media player 112 set to the second predetermined value. The circuitry 202 may be configured to control the media player 112 to switch the playback from the second media content 110B to the first media content 110A, based on the second predetermined value being a bit rate higher than the first bit rate of the OTA media stream.

For example, the media player 112 may be playing-back the second media content 110B over the OTT media stream. Upon a determination that the first bit rate of the first media content 110A is now higher than the second media content 110B, the circuitry 202 may set the reported bit rate of the media player 112 to the second predetermined value (e.g., "5000" kilo-bits per second), which may be higher than the first bit rate (e.g., "2100" kilo-bits per second) of the first media content 110A over the OTA media stream. Based on the reported bit rate of the media player 112 being set as the second predetermined value, the electronic device 102 may control the media player 112 to switch the playback from the second media content 110B over the OTT media stream to the first media content 110A over the OTA media stream. In an example, the first media content 110A over the OTA media stream may be played-back at a resolution of 720p at a frame rate of 40 fps.

With reference to FIG. 3, at 304, in an embodiment, the circuitry 202 may be configured to receive a signaling table associated with the received media content. The signaling table may be indicative of a type of media stream associated with the received media content. The circuitry 202 may be configured to determine that the OTT media stream is connected in the received media content, based on the received signaling table. The circuitry 202 may be configured to extract first metadata associated with the OTT media stream, based on the determination that the OTT media stream is connected. In an embodiment, the first metadata may correspond to a media presentation description (MPD) file associated with media content associated with the OTT media stream. The circuitry 202 may be configured to determine that the extracted first metadata indicates that a first audio video (AV) content (i.e., the first media content 110A) is present in the OTT media stream. For example, the circuitry 202 may be configured to detect that the received media content comprises the first media content 110A as the OTT media stream, based on the received signaling table. Further, the signaling table (including the first metadata) may indicate that the first media content is video content at a resolution of 480p at a frame rate of 20 fps.

In an embodiment, the circuitry 202 may be further configured to monitor that the electronic device is further tuned based on a set of conditions. The set of conditions may include the received signaling table being indicative of the exclusion of the OTT media stream in the received media content. The set of conditions may further include the OTT media stream being disconnected in the received media content. The set of conditions may further include the extracted first metadata being indicative of the exclusion of the first AV content in the OTT media stream. For example, in case the signaling table (and/or the extracted first metadata) indicates that the OTT media stream or the first AV content associated with the OTT media stream is absent from the received media content, the circuitry 202 may monitor that the electronic device 102 is being further tuned based on the set of conditions.

The circuitry 202 may be configured to extract second metadata associated with the OTA media stream, based on the set of conditions corresponding to the monitoring that the electronic device 102 is being further tuned. The circuitry 202 may be configured to disable the adaptive switching between the OTA playback and the OTT playback, based on the extracted second metadata. The circuitry 202 may be further configured to control the media player 112 to playback of the first media content 110A based on the disabled adaptive switching. The circuitry 202 may be configured to extract the second metadata associated with the OTA media stream, based on the determination that the first metadata indicates that the first AV content is present in the OTT media stream. The circuitry 202 may be configured to determine that the extracted second metadata indicates that the second AV content is present in the OTA media stream. The circuitry 202 may be configured to control the media player 112 to adaptively switch the playback between the first media content 110A and the second media content 1101B, based on the determination that the extracted second metadata indicates presence of the second AV content in the OTA media stream.

In an embodiment, the circuitry 202 may be configured to control the media player 112 to switch the playback from the second media content 110B to the first media content 110A, based on the determination that the extracted second metadata indicates the exclusion of the second AV content in the OTA media stream. The circuitry 202 may be configured to set the reported bit rate of the media player 112 to a third predetermined value, based on the monitoring that the electronic device 102 is tuned for OTA playback. The circuitry 202 may be configured to control the media player 112 to playback the second media content 110B, based on the reported bit rate of the media player 112 being set to the third predetermined value.

The electronic device 102 of the present disclosure may provide an automatic and robust framework for initiation of tuning of the electronic device 102 and adaptively switching the playback on the media player 112 between the broadcast services and broadband services. In order to do so, the electronic device 102 may receive the media content for playback on the media player 112. The received media content may be selected and tuned on the electronic device 102. Thereafter, the electronic device 102 may determine that the received media content includes the first media content 110A over the OTA media stream and the second media content 110B over the OTT stream. Based on the determination that the received media content includes the first media content 110A over the OTA media stream and the second media content 110B over the OTT stream, the electronic device 102 may compare the first bit rate of the OTA media stream with the second bit rate of the OTT media stream. Further, the electronic device 102 may set the reported bit rate of the media player 112 to the first predetermined value higher than the second bit rate of the OTT media stream, based on the comparison of the first bit rate and the second bit rate. Based on the reported bit rate set to the first predetermined value, the media player 112 may be controlled to playback the OTT media content. Further, the electronic device 102 may be monitored being tuned for the OTA playback, based on the first bit rate being higher than the second bit rate. Based on the monitoring of the electronic device 102, the reported bit rate of the media player 112 may be set to the second predetermined value. Thereafter, based on the setting of the reported bit rate of the media player 112 set to the second predetermined value, the media player 112 may be controlled to playback the first media content 110A. The disclosed electronic device 102 may be incorporated in applications such as, the intelligent electronic devices or Internet of Things (IoT) devices or the display devices or any other devices, to efficiently perform adaptive switching between the media streams.

Traditional systems may often rely on a single media source, either broadband or broadcast, which can lead to interruptions in service if the source becomes unavailable or congested. In contrast, the electronic device 102 of the present disclosure may intelligently switch between broadband and broadcast sources based on various conditions such as service availability, connection quality, and video resolution, which may ensure a seamless viewing experience.

The electronic device 102 of the present disclosure may have adaptive capabilities that may allow optimization of content playback based on the current conditions. For instance, if the quality of the broadband connection is poor, the electronic device 102 may switch to a broadcast source to maintain continuous streaming. Conversely, if the broadcast signal is weak, the electronic device 102 may dynamically switch to a broadband source to enhance picture quality. Thus, unlike traditional systems, the electronic device 102 may not require manual intervention to switch sources. Furthermore, the electronic device 102 may be designed to support both broadcast receivers that support broadband representations of live content, and also, apps that are designed to primarily support broadband playback of live content but also have access to a broadcast tuner. The dual support may allow the electronic device 102 to cater to a wider range of use cases and scenarios, which may make the electronic device 102 more versatile than traditional systems that support either broadcast or broadband delivery.

Figure 4:
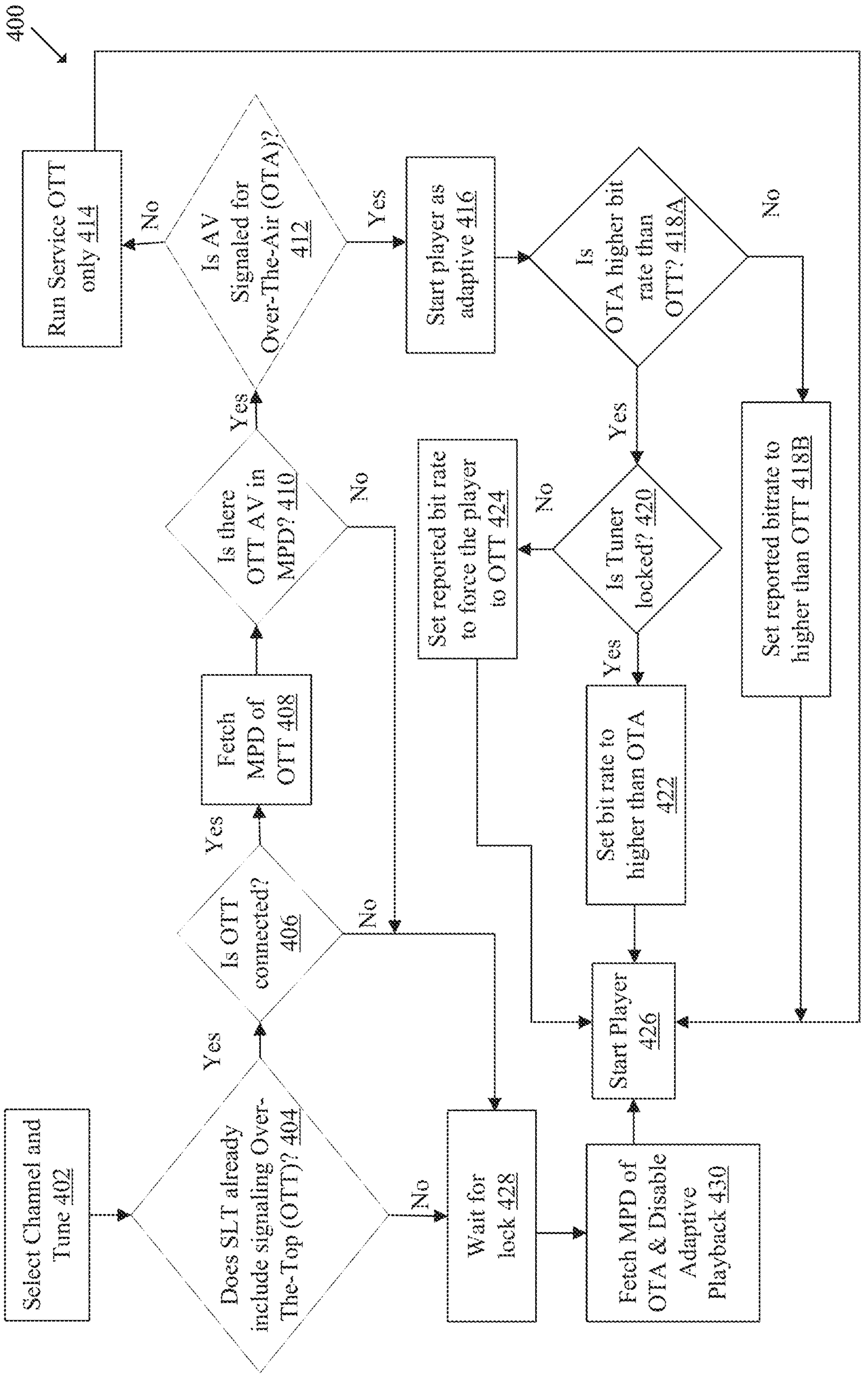
FIG. 4 is a flowchart that illustrates exemplary operations to tune a media player for broadcast and broadband services, in accordance with an embodiment of the disclosure.

FIG. 4 is a flowchart that illustrates exemplary operations to tune a media player for broadcast and broadband services, in accordance with an embodiment of the disclosure. FIG. 4 is described in conjunction with elements from FIG. 1, FIG. 2, and FIG. 3. With reference to FIG. 4, there is shown a flowchart 400. The flowchart 400 may include operations from 402 to 430 and may be implemented by the electronic device 102 of FIG. 1 or by the circuitry 202 of FIG. 2. The flowchart 400 may start at 402 and proceed to 404.

At 402, the channel and tuning associated with electronic device 102 may be selected. The circuitry 202 may be configured to receive the media content for playback on the media player 112. The received media content may be selected and tuned on the electronic device 102. Details related to the received media content are further described, for example, in FIG. 3 (at 302).

At 404, it may be determined that the signaling table (denoted by SLT) already includes signaling OTT metadata. The circuitry 202 may be configured to determine that the received media content is the OTA media stream representation or the OTT media stream representation. Details related to the determination with respect to the media content as being the OTA media stream representation or the OTT media stream representation are further described, for example, in FIG. 3 (at 304).

At 406, it may be determined that the OTT media content is connected in the received media content. The circuitry 202 may be configured to determine that the received media content is available as the OTT media stream representation. Details related to the determination of the media content as the OTT media representation are further described, for example, in FIG. 3 (at 304).

At 408, it may be determined whether a media presentation description (MPD) file of the OTT media stream representation is fetched. The circuitry 202 may be configured to determine that the received media content has the MPD file available as the OTT media stream representation. Details related to the determination of the media content as the OTT media stream representation are further described, for example, in FIG. 3 (at 304).

At 410, it may be determined that the received MPD file available as the OTT media stream representation comprises the first audio visual media content in the MPD file. The circuitry 202 may be configured to determine that the received media content as the MPD file includes the second media content 110B over the OTT media stream as the first audio visual media content. Details related to the determination of the received MPF file as the media content containing the first AV content in the MPD file are further described, for example, in FIG. 3 (at 304).

At 412, it may be determined whether AV is signaled for OTA. Based on a determination that the received MPD file available as the OTT media stream representation comprises the first AV media content in the MPD file, it may be determined that the second audio visual content associated with the OTA media stream is signaled. The circuitry 202 may be configured to determine if the received media content includes the second AV content associated with the OTA media stream. The circuitry 202 may be configured to compare the first bit rate of the OTA media stream with the second bit rate of the OTT media stream. Details related to the determination that the second audio visual content associated with the OTA media stream is signaled are further described, for example, in FIG. 3 (at 304).

At 414, based on a determination that the second audio visual content associated with the OTA media stream is not signaled, the media player 112 may be enabled to select the OTT media representation, thereby running OTT service only. The circuitry 202 may be configured to enable the selection of the OTT media representation for playback, based on the determination that the second audio visual content associated with the OTA media stream is not signaled. Details related to the determination that the OTT media stream representation is selected for running are further described, for example, in FIG. 3 (at 304).

At 416, based on the determination that the second audio visual content associated with the OTA media stream is signaled, the media player 112 may be enabled to operate in a media adaptive switching mode, to adaptively switch between the OTA media stream and the OTT media stream. The circuitry 202 may be configured to enable the media player 112 to operate in the media adaptive switching mode. Details related to the determination that the media player is enabled to operate in the media adaptive switching mode are further described, for example, in FIG. 3 (at 310 to 316).

At 418A, it may be determined that the OTA media stream representation has a higher bit rate than OTT media stream representation. The circuitry 202 may be configured to compare the first bit rate of the OTA media stream representation with the second bit rate of the OTT media stream representation. Details related to the comparison of the first bit rate with the second bit rate, to determine if the OTA media stream representation is having a higher bit rate than OTT media stream representation are further described, for example, in FIG. 3 (at 306, in FIG. 3).

In case, it is determined that the OTA media stream representation is not having the higher bit rate than the OTT media stream representation, the circuitry 202 may be configured to enable the media player 112 to set the reported bit rate higher than the OTT media stream representation. The circuitry 202 may be further configured to control the media player 112 to playback of the second media content 110B. Details related to the setting of the bit rate higher than the OTT media stream representation are further described, for example, in FIG. 3 (at 308 and 310, in FIG. 3).

At 418B, based on a determination that the OTA bit rate (i.e., the first bit rate) is not higher than the OTT bit rate (i.e., the second bit rate), the reported bit rate may be set to higher than OTT bit rate (i.e., the second bit rate). The circuitry 202 may be configured to set the reported bit rate higher than the OTT media stream representation. The reported bit rate of the media player 112 may be set to the value higher than the second bit rate of the OTT media stream representation, based on the determination that the first bit rate is not higher than the second bit rate.

At 420, based on the determined that the OTA media stream representation has a higher bit rate than the OTT media stream representation, it may be determined that the tuner of the electronic device 102 is locked. The circuitry 202 may be configured to monitor that the electronic device 102 is tuned for OTA playback, based on the first bit rate being higher than the second bit rate. Details related to the determination regarding the locking of the tuner are further described, for example, in FIG. 3 (at 312, in FIG. 3).

At 422, based on a determination that the tuner is locked, the reported bit rate may be set to a value higher than the OTA media stream representation. The circuitry 202 may be configured to set the reported bit rate higher than the OTA media stream representation. The reported bit rate of the media player 112 may be set to the value higher than the first bit rate of the OTA media stream representation, based on the monitoring that the electronic device 102 is tuned for OTA playback. Details related to the determination regarding the setting of the reported bit rate higher than the OTA media stream representation are further described, for example, in FIG. 3 (at 314, in FIG. 3).

At 424, based on a determined that the tuner is not locked, the reported bit rate of the media player 112 may be set to a value higher than the second bit rate of the OTT media stream to force the media player 112 to start the OTT media stream representation. Details related to the determination regarding the setting of the reported bit rate higher than the OTT media stream representation are further described, for example, in FIG. 3 (at 306, in FIG. 3)

At 426, upon setting of the bit rate higher than the bit rate of the OTA media stream representation, the media player 112 may be started and enabled for playback of the first media content 110A, based on the set reported bit rate higher than the OTA media stream representation. The circuitry 202 may be configured to control the media player 112 to playback of the first media content 110A, based on the reported bit rate set to the second predetermined value. Details related to the initiation of the playback of the first media content 110A by the media player 112, based on the set reported bit rate higher than the OTA media stream representation are further described, for example, in FIG. 3 (at 316, in FIG. 3). Control may pass to end.

At 428, based on a determination at 406 that the OTT media content is not connected in the received media content, the tuner of the electronic device 102 may be configured to get locked. The circuitry 202 may be configured to lock the tuner of the electronic device 102 based on the determination (at 406) that the OTT media content is not connected in the received media content.

At 430, based on the tuner being locked, the MPD file of the OTA media stream representation may be fetched to disable the adaptive media streaming mode. The circuitry 202 may be configured to fetch the MPD file of the OTA media stream representation to disable the adaptive media streaming mode, based on the tuner of the electronic device 102 being locked (at 428).

Although the flowchart 400 is illustrated as discrete operations, such as 402, 404, 406, 408, 410, 412, 414, 416, 418A, 418B, 420, 422, 424, 426, 428, and 430 the disclosure is not so limited. Accordingly, in certain embodiments, such discrete operations may be further divided into additional operations, combined into fewer operations, or eliminated, depending on the implementation without detracting from the essence of the disclosed embodiments.

Figure 5:
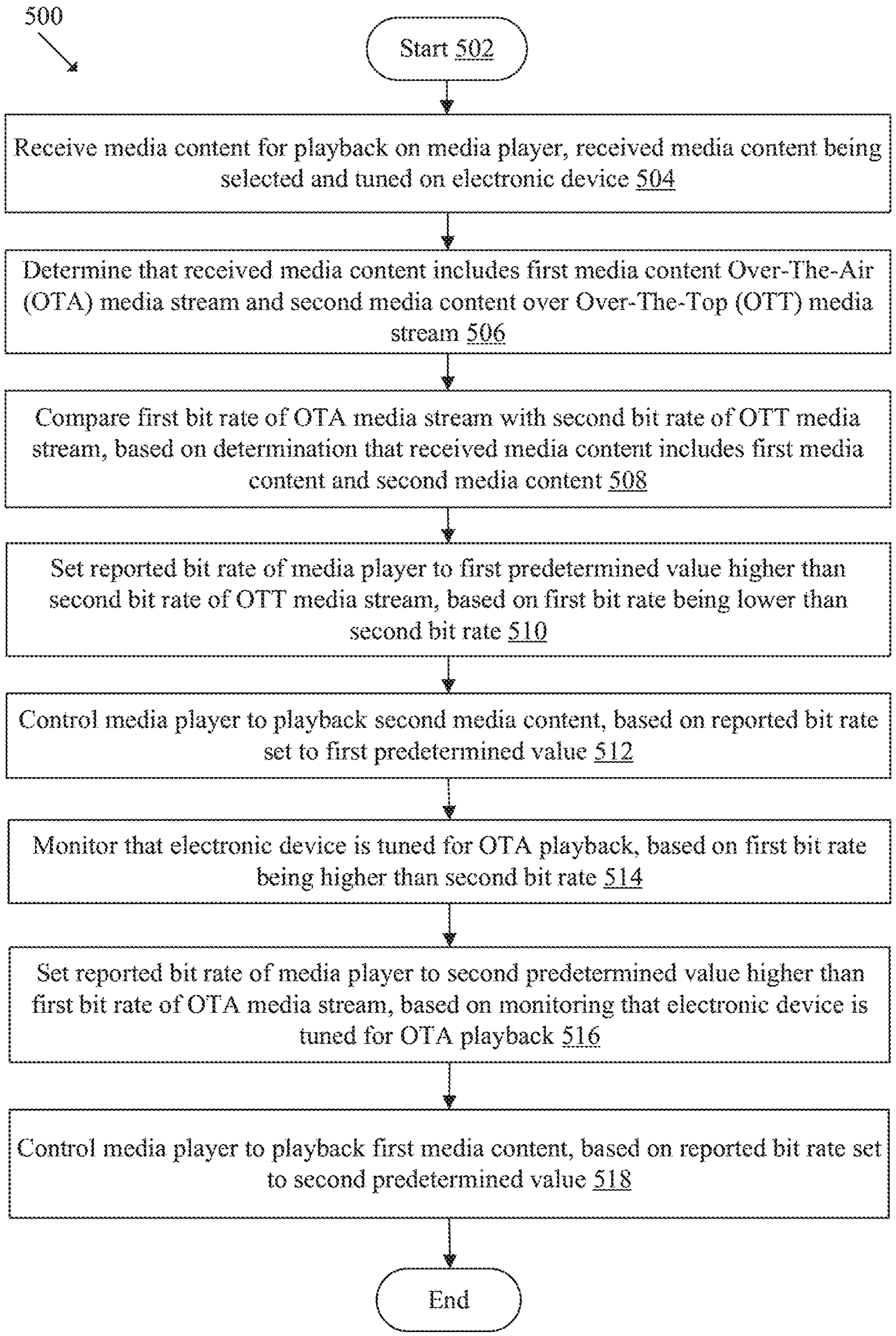
FIG. 5 is a flowchart that illustrates operations of an exemplary method to tune a media player for broadcast and broadband services, in accordance with an embodiment of the disclosure.

FIG. 5 is a flowchart that illustrates operations of an exemplary method to tune a media player for broadcast and broadband services, in accordance with an embodiment of the disclosure. FIG. 5 is described in conjunction with elements from FIG. 1, FIG. 2, FIG. 3, and FIG. 4. With reference to FIG. 5, there is shown an exemplary method 500. The exemplary method may include operations from 502 to 518 and may be implemented by the electronic device 102 of FIG. 1 or by the circuitry 202 of FIG. 2. The exemplary method 500 may start at 502 and proceed to 504.

At block 504, the media content may be received for the playback on the media player 112, wherein the received media content may be selected and tuned on the electronic device 102. The circuitry 202 may be configured to receive the media content for playback on the media player 112. The received media content may be selected and tuned on the electronic device 102. Details related to the receipt of the media content are described further, for example, in FIG. 3 (at 302).

At block 506, it may be determined that the received media content includes the first media content 110A over the OTA media stream and the second media content 110B over the OTT media stream. The circuitry 202 may be configured to determine that the received media content includes the first media content 110A over the OTA media stream and the second media content 110B over the OTT media stream. Details related to the determination of that the received media content includes the first media content and the second media contents are described further, for example, in FIG. 3 (at 304).

At block 508, the first bit rate of the OTA media stream may be compared with the second bit rate of the OTT media stream, based on the determination that the received media content includes the first media content 110A and the second media content 110B. The circuitry 202 may be configured to compare the first bit rate of the OTA media stream with the second bit rate of the OTT media stream, based on the determination that the received media content includes the first media content 110A and the second media content 110B. Details related to the comparison of the first bit rate and the second bit rate are described further, for example, in FIG. 3 (at 306).

At block 510, the reported bit rate of the media player 112 may be set to the first predetermined value higher than the second bit rate of the OTT media stream, based on the first bit rate being lower than the second bit rate. The circuitry 202 may be configured to set the reported bit rate of the media player 112 to the first predetermined value higher than the second bit rate of the OTT media stream, based on the comparison of the first bit rate of the first media content 110A and the second bit rate of the second media content 110B. The first predetermined value may correspond to the bit rate higher than the second bit rate of the OTT media stream, or the bit rate higher than the first bit rate of the OTA media stream. In such a case, the first bit rate may be lower than the second bit rate. Details related to the setting of the reported bit rate of the media player to the first predetermined value are described further, for example, in FIG. 3 (at 308).

At block 512, the media player 112 may be controlled to playback the second media content 1101B, based on the reported bit rate set to the first predetermined value. The circuitry 202 may be configured to control the media player 112 to playback the second media content 110B, based on the reported bit rate of the media player 112 set to the first predetermined value. Details related to the control of the playback of the second media content are described further, for example, in FIG. 3 (at 310).

At block 514, the electronic device 102 may be monitored that the electronic device 102 is tuned for OTA playback, based on the first bit rate being higher than the second bit rate. The circuitry 202 may be configured to monitor that the electronic device 102 is tuned for OTA playback. The electronic device 192 may be monitored, based on the first bit rate being higher than the second bit rate. Details related to the monitoring of the electronic device are described further, for example, in FIG. 3 (at 312).

At block 516, the reported bit rate of the media player 112 may be set to the second predetermined value higher than the first bit rate of the OTA media stream, based on the monitoring that the electronic device 102 is tuned for OTA playback. The circuitry 202 may be configured to set the reported bit rate of the media player 112 to the second predetermined value, based on the monitoring that the electronic device 102 is tuned for OTA playback. The second predetermined value may correspond to the bit rate higher than the first bit rate of the OTA media stream. Details related to the setting of the reported bit rate of the media player to the second predetermined value are described further, for example, in FIG. 3 (at 314).

At block 518, the media player 112 may be controlled to playback the first media content 110A, based on the reported bit rate set to the second predetermined value. The circuitry 202 may be configured to control the media player 112 to playback the first media content 110A, based on the reported bit rate of the media player 112 set to the second predetermined value. The circuitry 202 may be configured to control the media player 112 to switch the playback from the second media content 110B to the first media content 110A, based on the second predetermined value being the bit rate higher than the first bit rate of the OTA media stream. Details related to the control of the media player to playback the first median content are described further, for example, in FIG. 3 (at 316). Control may pass to end.

Although the exemplary method 500 is illustrated as discrete operations, such as, 504, 506, 508, 510, 512, 514, 516, and 518, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include receipt of media content for playback on a media player (e.g., the media player 112). The operations may further include determination that the received media content includes first media content (e.g., the first media content 110A) over an OTA media stream and second media content (e.g., the second media content 1101B) over an OTT media stream. The operations may further include comparison of a first bit rate of the OTA media stream with a second bit rate of the OTT media stream, based on the determination that the received media content includes the first media content 110A and the second media content 110B. The operations may further include setting of a reported bit rate of the media player 112 to a first predetermined value higher than the second bit rate of the OTT media stream, based on the comparison between the first bit rate and the second bit rate. The operations may further include control of the media player 112 to playback of the second media content 110B, based on the reported bit rate of the media player 112 set to the first predetermined value. The operations may further include monitoring that the electronic device 102 is tuned for OTA playback, based on the first bit rate higher than the second bit rate. The operations may further include the reported bit rate of the media player 112 set to a second predetermined value higher than the first bit rate of the OTA media stream, based on the monitoring of the electronic device 102. The operations may further include control of the media player 112 to playback the first media content 110A, based on the reported bit rate of the media player 112 set to the second predetermined value.

Exemplary aspects of the disclosure may provide an electronic device (such as, the electronic device 102 of FIG. 1) that includes circuitry (such as, the circuitry 202). The circuitry 202 may be configured to receive media content for playback on the media player 112. The circuitry 202 may be configured to determine that the received media content includes first media content (e.g., the first media content 110A) over an OTA media stream and second media content (e.g., the second media content 1101B) over an OTT media stream. The circuitry 202 may be configured to compare a first bit rate of the OTA media stream with a second bit rate of the OTT media stream, based on the determination that the received media content includes the first media content 110A and the second media content 110B. The circuitry 202 may be configured to set a reported bit rate of the media player 112 to the first predetermined value higher than the second bit rate of the OTT media stream, based on the comparison between the first bit rate and the second bit rate. The circuitry 202 may be configured to initiate control of the media player 112 to playback of the second media content 1101B, based on the reported bit rate of the media player 112 set to the first predetermined value. The circuitry 202 may be configured to monitor that the electronic device 102 is tuned for OTA playback. The circuitry 202 may be configured to set the reported bit rate of the media player 112 to the second predetermined value, based on the monitoring that the electronic device 102 is tuned for OTA playback. The circuitry 202 may be configured to initiate control of the media player 112 to playback the first media content 110A, based on the reported bit rate of the media player 112 set to the second predetermined value.

The circuitry 202 may be configured to receive a signaling table associated with the received media content. The signaling table may be indicative of a type of media stream associated with the received media content. The circuitry 202 may be configured to determine that the OTT media stream is connected in the received media content, based on the received signaling table. The circuitry 202 may be further configured to extract first metadata associated with the OTT media stream, based on the determination that the OTT media stream is connected. The circuitry 202 may be configured to determine that the extracted first metadata indicates that first audio video content is present in the OTT media stream. The circuitry 202 may be further configured to monitor that the electronic device 102 is further tuned based on a set of conditions including at least one of the received signaling table being indicative of an exclusion of the OTT media stream in the received media content, the OTT media stream being disconnected in the received media content, or the extracted first metadata being indicative of exclusion of the first audio video content in the OTT media stream.

The circuitry 202 may be further configured to extract second metadata associated with the OTA media stream, based on the set of conditions corresponding to the monitoring that the electronic device 102 may be further tuned. The circuitry 202 may be configured to disable adaptive switching between OTA and OTT playback, based on the extracted second metadata. The circuitry 202 may be configured to control the media player 112 to playback the first media content 110A based on the disabled adaptive switching.

The circuitry 202 may be further configured to extract second metadata associated with the OTA media stream, based on the determination that the first metadata indicates that the first audio video content is present in the OTT media stream. The circuitry 202 may be configured to determine that the extracted second metadata indicates that second audio video content is present in the OTA media stream. The circuitry 202 may be configured to control the media player 112 to adaptively switch playback between the first media content 110A and the second media content 1101B, based on the determination the extracted second metadata indicates a presence of the second audio video content in the OTA media stream. The circuitry 202 may be further configured to control the media player 112 to playback the second media content 1101B, based on the determination that the extracted second metadata indicates an exclusion of the second audio video content in the OTA media stream.

The circuitry 202 may be further configured to set the reported bit rate of the media player 112 to a third predetermined value, based on the monitoring that the electronic device 102 is tuned for OTA playback. The circuitry 202 may be further configured to control the media player 112 to playback the second media content based on the reported bit rate of the media player being set to the third predetermined value.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:

circuitry configured to:

receive media content for playback on a media player, wherein the received media content is selected and tuned on the electronic device;

determine that the received media content includes first media content over an Over-The-Air (OTA) media stream and second media content over an Over-The-Top (OTT) media stream;

compare a first bit rate of the OTA media stream with a second bit rate of the OTT media stream, based on the determination that the received media content includes the first media content and the second media content;

set a reported bit rate of the media player to a first value higher than the second bit rate of the OTT media stream, based on the first bit rate being lower than the second bit rate;

control the media player to playback the second media content, based on the reported bit rate set to the first value;

monitor that the electronic device is tuned for OTA playback, based on the first bit rate being higher than the second bit rate;

set the reported bit rate of the media player to a second value higher than the first bit rate of the OTA media stream, based on the monitored electronic device that is tuned for the OTA playback; and control the media player to playback the first media content, based on the reported bit rate set to the second value.

2. The electronic device according to claim 1, wherein the circuitry is further configured to receive a signaling table associated with the received media content, wherein the signaling table is indicative of a type of media stream associated with the received media content.

3. The electronic device according to claim 2, wherein the circuitry is further configured to:

determine that the OTT media stream is connected in the received media content, based on the received signaling table;

extract first metadata associated with the OTT media stream, based on the determination that the OTT media stream is connected; and determine that the extracted first metadata indicates that first audio video content is present in the OTT media stream.

4. The electronic device according to claim 3, wherein the circuitry is further configured to monitor that the electronic device is further tuned based on a set of conditions including at least one of:

the received signaling table being indicative of an exclusion of the OTT media stream in the received media content, the OTT media stream being disconnected in the received media content, or the extracted first metadata being indicative of exclusion of the first audio video content in the OTT media stream.

5. The electronic device according to claim 4, wherein the circuitry is further configured to:

extract second metadata associated with the OTA media stream, based on the set of conditions corresponding to the monitored electronic device that is further tuned;

disable adaptive switching between the OTA playback and OTT playback, based on the extracted second metadata; and control the media player to playback the first media content based on the disabled adaptive switching.

6. The electronic device according to claim 3, wherein the circuitry is further configured to:

extract second metadata associated with the OTA media stream, based on the determination that the first metadata indicates that the first audio video content is present in the OTT media stream;

determine that the extracted second metadata indicates that second audio video content is present in the OTA media stream; and control the media player to adaptively switch playback between the first media content and the second media content, based on the determination the extracted second metadata indicates a presence of the second audio video content in the OTA media stream.

7. The electronic device according to claim 6, wherein the circuitry is further configured to control the media player to playback the second media content, based on the determination that the extracted second metadata indicates an exclusion of the second audio video content in the OTA media stream.

8. The electronic device according to claim 1, wherein the circuitry is further configured to:

set the reported bit rate of the media player to a third value, based on the monitored electronic device that is tuned for the OTA playback; and control the media player to playback the second media content based on the reported bit rate of the media player being set to the third value.

9. A method, comprising:

in an electronic device:

receiving media content for playback on a media player, wherein the received media content is selected and tuned on the electronic device;

determining that the received media content includes first media content over an Over-The-Air (OTA)

media stream and second media content over an Over-The-Top (OTT) media stream;

comparing a first bit rate of the OTA media stream with a second bit rate of the OTT media stream, based on the determination that the received media content includes the first media content and the second media content;

setting a reported bit rate of the media player to a first value higher than the second bit rate of the OTT media stream, based on the first bit rate being lower than the second bit rate;

controlling the media player to playback the second media content, based on the reported bit rate set to the first value;

monitoring that the electronic device is tuned for OTA playback, based on the first bit rate being higher than the second bit rate;

setting the reported bit rate of the media player to a second value higher than the first bit rate of the OTA media stream, based on the monitoring that the electronic device is tuned for the OTA playback; and controlling the media player to playback the first media content, based on the reported bit rate set to the second value.

10. The method according to claim 9, further comprising receiving a signaling table associated with the received media content, wherein the signaling table is indicative of a type of media stream associated with the received media content.

11. The method according to claim 10, further comprising:

determining that the OTT media stream is connected in the received media content, based on the received signaling table;

extracting first metadata associated with the OTT media stream, based on the determination that the OTT media stream is connected; and determining that the extracted first metadata indicates that first audio video content is present in the OTT media stream.

12. The method according to claim 11, further comprising monitoring that the electronic device is further tuned based on a set of conditions including at least one of:

the received signaling table being indicative of an exclusion of the OTT media stream in the received media content, the OTT media stream being disconnected in the received media content, or the extracted first metadata being indicative of exclusion of the first audio video content in the OTT media stream.

13. The method according to claim 12, further comprising:

extracting second metadata associated with the OTA media stream, based on the set of conditions corresponding to the monitoring that the electronic device is further tuned;

disabling adaptive switching between the OTA playback and OTT playback, based on the extracted second metadata; and controlling the media player to playback the first media content based on the disabled adaptive switching.

14. The method according to claim 11, further comprising:

extracting second metadata associated with the OTA media stream, based on the determination that the first metadata indicates that the first audio video content is present in the OTT media stream;

determining that the extracted second metadata indicates that second audio video content is present in the OTA media stream; and controlling the media player to adaptively switch playback between the first media content and the second media content, based on the determination the extracted second metadata indicates a presence of the second audio video content in the OTA media stream.

15. The method according to claim 14, further comprising controlling the media player to playback the second media content, based on the determination that the extracted second metadata indicates an exclusion of the second audio video content in the OTA media stream.

16. The method according to claim 9, further comprising:

setting the reported bit rate of the media player to a third value, based on the monitoring that the electronic device is tuned for the OTA playback; and controlling the media player to playback the second media content based on the reported bit rate of the media player being set to the third value.

17. A non-transitory computer-readable medium having stored thereon, computer-executable instructions that when executed by an electronic device, causes the electronic device to execute operations, the operations comprising:

receiving media content for playback on a media player, wherein the received media content is selected and tuned on the electronic device;

determining that the received media content includes first media content over an Over-The-Air (OTA) media stream and second media content over an Over-The-Top (OTT) media stream;

comparing a first bit rate of the OTA media stream with a second bit rate of the OTT media stream, based on the determination that the received media content includes the first media content and the second media content;

setting a reported bit rate of the media player to a first value higher than the second bit rate of the OTT media stream, based on the first bit rate being lower than the second bit rate;

controlling the media player to playback the second media content, based on the reported bit rate set to the first value;

monitoring that the electronic device is tuned for OTA playback, based on the first bit rate being higher than the second bit rate;

setting the reported bit rate of the media player to a second value higher than the first bit rate of the OTA media stream, based on the monitoring that the electronic device is tuned for the OTA playback; and controlling the media player to playback the first media content, based on the reported bit rate set to the second value.

18. The non-transitory computer-readable medium according to claim 17, wherein the operations further comprise:

receiving a signaling table associated with the received media content, wherein the signaling table is indicative of a type of media stream associated with the received media content;

determining that the OTT media stream is connected in the received media content, based on the received signaling table;

extracting first metadata associated with the OTT media stream, based on the determination that the OTT media stream is connected; and determining that the extracted first metadata indicates that first audio video content is present in the OTT media stream.

19. The non-transitory computer-readable medium according to claim 18, wherein the operations further comprise:

monitoring that the electronic device is further tuned based on a set of conditions including at least one of:

the received signaling table being indicative of an exclusion of the OTT media stream in the received media content, the OTT media stream being disconnected in the received media content, or the extracted first metadata being indicative of exclusion of the first audio video content in the OTT media stream;

extracting second metadata associated with the OTA media stream, based on the set of conditions corresponding to the monitoring that the electronic device is further tuned;

disabling adaptive switching between the OTA playback and OTT playback, based on the extracted second metadata; and controlling the media player to playback the first media content based on the disabled adaptive switching.

20. The non-transitory computer-readable medium according to claim 18, wherein the operations further comprise:

extracting second metadata associated with the OTA media stream, based on the determination that the first metadata indicates that the first audio video content is present in the OTT media stream;

determining that the extracted second metadata indicates that second audio video content is present in the OTA media stream; and controlling the media player to adaptively switch playback between the first media content and the second media content, based on the determination the extracted second metadata indicates a presence of the second audio video content in the OTA media stream.

* * * * *